US008566927B2

(12) United States Patent
Di Iorio

(10) Patent No.: US 8,566,927 B2
(45) Date of Patent: Oct. 22, 2013

(54) METHOD FOR DETECTING AND REACTING AGAINST POSSIBLE ATTACK TO SECURITY ENFORCING OPERATION PERFORMED BY A CRYPTOGRAPHIC TOKEN OR CARD

(75) Inventor: Paolo Di Iorio, Marcianise (IT)

(73) Assignee: STMicroelectronics International N.V., Geneva (CH)

( * ) Notice: Subject to any disclaimer, the term of this patent is extended or adjusted under 35 U.S.C. 154(b) by 737 days.

(21) Appl. No.: 10/570,378

(22) PCT Filed: Jun. 30, 2005

(86) PCT No.: PCT/EP2005/007065
§ 371 (c)(1),
(2), (4) Date: Jan. 2, 2008

(87) PCT Pub. No.: WO2006/002926
PCT Pub. Date: Jan. 12, 2006

(65) Prior Publication Data
US 2008/0209550 A1    Aug. 28, 2008

(30) Foreign Application Priority Data
Jun. 30, 2004    (EP) .................................... 04425482

(51) Int. Cl.
*G06F 21/00*    (2013.01)
(52) U.S. Cl.
USPC ........... 726/22; 726/9; 726/20; 726/23; 380/1

(58) Field of Classification Search
USPC ............................................ 726/9, 20, 22, 23
See application file for complete search history.

(56) References Cited

U.S. PATENT DOCUMENTS

| 4,879,645 | A | 11/1989 | Tamada et al. ................. 364/200 |
| 6,496,808 | B1 * | 12/2002 | Aiello et al. .................... 705/67 |
| 6,726,108 | B1 | 4/2004 | Guion ........................... 235/492 |
| 6,775,780 | B1 * | 8/2004 | Muttik ........................... 726/24 |
| 2002/0124183 | A1 | 9/2002 | Marinet et al. ................. 713/200 |
| 2003/0046593 | A1 * | 3/2003 | Xie et al. ........................ 713/202 |
| 2004/0117624 | A1 * | 6/2004 | Brandt et al. .................. 713/166 |

OTHER PUBLICATIONS

Siva Sai Yerubandi, "*Differential Power Analysis*", Oregon State University, Oct. 17, 2002, pp. 1-4 (p. 3, col. 1).

* cited by examiner

*Primary Examiner* — Justin T Darrow
(74) *Attorney, Agent, or Firm* — Allen, Dyer, Doppelt, Milbrath & Gilchrist, P.A.

(57) ABSTRACT

The approach defines a protection mechanism against attacks to a security enforcing operation performed by cryptographic token or smart card. It is based on an attack detector which signals the main elaboration or processing system regarding a potential attack situation. The approach addresses SIM cloning problems of telecommunications operators who use old and breakable cryptographic algorithms such as the COMP-128 and do not want to invest in updating the network authentication systems with more resistant authentication cryptographic algorithms. The approach may be applicable to the typical telecommunications operator in an emerging market that does not use state of the art technology.

16 Claims, 3 Drawing Sheets

METHOD FOR DETECTING AND REACTING AGAINST POSSIBLE ATTACK TO SECURITY ENFORCING OPERATION PERFORMED BY A CRYPTOGRAPHIC TOKEN OR CARD

FIELD OF THE INVENTION

This invention relates to a method for detecting and reacting against possible attacks to a security enforcing operation performed by a cryptographic token or IC card. The invention further relates to a token or IC card structured to implement the method including detection and reaction against possible attacks to security enforcing operations and including a microcontroller with associated or embedded memory portions.

BACKGROUND OF THE INVENTION

As is conventional in this specific technical field, secure tokens are available as integrated circuit cards incorporating security software and specifically designed to retain secret data and information. Secure tokens can also have programmable language, such as Java, enabling them to run applications. Secure or cryptographic tokens or cards include a protected storage area and a non-protected storage area. The protected area can only be accessed using a pin code created at the secure token creation, but that can be changed by the user.

The cryptographic token is normally used to store a secret key and to calculate a cryptographic algorithm using such a secret key on some input data that is received from an outside source. The result of the calculation is sent back to the outside source (external word) that uses such a calculation for completing an authentication procedure.

As may be understood, the authentication procedure is a weakness of the security relating to cryptographic tokens or cards since a tampering attack may be performed during this procedure to access the secret information stored in the token or card. The prior art already provides various approaches for anti-tampering methods for reacting against possible attacks to cryptographic token and smart card storing secret information such as the secret keys used by the token in the security operation.

The prior art techniques focus the attention on countermeasures against power analysis and electromagnetic analysis attacks by trying to make it difficult for an attack based on analysis of the power and/or the electromagnetic emission during the manipulation of sensitive information. Some of the countermeasures can be implemented either in the algorithm code or at the hardware level and mainly try to obscure the sensitive information observable from the power traces and from the electromagnetic emissions.

Typically these countermeasures include adding noise on the power absorbed by the card or introducing random delay in the code execution. The random delay reduces the correlation between different traces and makes the attack more difficult.

Other countermeasures to counteract such attacks are based on the masking of the sensitive information during the elaboration via random transformation. However, these techniques are specifically designed for protecting the implementation of the algorithm but they do not give any protection to the logic on which the algorithm is founded. In other words, no matter how good and complex the algorithm may be, it becomes weaker over time as the computation power available to an attacker increases and the algorithm become well known and studied by the attackers. Moreover, the countermeasures against power and electromagnetic analysis implemented in the algorithm code are often implementation dependent and cannot be applied to all cryptographic algorithms in the same manner.

Another countermeasure approach to reduce the risks of attacks to a cryptographic token or Smart Card is known as authentication Counter. An authentication counter tries to limit the number of security enforcing procedures that the system can perform in all the system life. It addresses both attacks oriented to break the cryptographic logical and mathematics and attacks mining the implementation. However, this countermeasure is no more effective in many cases since the number of executions of security procedures to break the system is typically minor compared to the total number of executions in the lifecycle of the system.

A further approach is disclosed in the U.S. Pat. No. 4,879,645 relating to a data processing device with high security of stored programs. This document teaches to detect an input command for the cryptographic token or card and to count the number of times this input command is executed; however, this approach does not take into consideration the possibility of assigning a ponder value to such an input command.

Other techniques to increase the security procedure are based on the use of session keys evaluated each time a cryptographic elaboration is required. Even if this technique may be considered more efficient when compared to the previously cited prior art techniques, it is relatively complex to be implemented and this is due to the fact that the cryptographic token and the other primary circuit portions involved in the security operation store not only a common master key but also a common state should be used to elaborate the session keys that have to always be synchronized.

SUMMARY OF THE INVENTION

An object of the present invention is to provide an efficient method for detecting and reacting against possible attacks to a security enforcing operation performed by a cryptographic token or a smart card having features allowing it to be independent from the implementation and assuring protection to the logic on which the algorithm is founded, not only to its implementation.

Another object of the present invention is that of protecting authentication procedures based on cryptographic operation in which the authentication response is performed outside the cryptographic token.

Still another object of the present invention is that of enforcing a security operation regarding cryptographic token while maintaining a certain reasonable level of complexity.

A further object of the invention is that of providing a method capable of reacting against possible attacks guaranteeing security without considering a static threshold to the number of sensible operations in the lifecycle of the system. The method should preserve its safety even if the number of executions of the security procedure to break the system is less than a threshold depending on improvement of the techniques implemented by the attackers.

A further object of the present invention is that of providing a method capable of detecting a potential attack to a security enforcing operation in a dynamic and implementation independent way.

The approach on which the invention is based is that of providing the token or card with an attack detector capable of issuing a signal to the main elaboration or processing system informing about a potential attack situation.

A first embodiment of the invention provides a method for detecting and reacting against possible attacks to a security enforcing operation performed by a cryptographic token or a smart card including: detecting an input command for the cryptographic token; assigning a ponder value to such an input command; updating a counter value; comparing the counter value with a reference threshold; providing a warning signal output according to the result of the comparing phase; wherein the counter value changes dynamically depending on the sequence of execution of the input commands, the counter value being updated according to the ponder values associated to the executed input commands.

Another embodiment of the invention provides for a token an IC card or an electronic embedded system structured to implement the inventive method and including circuitry or means for detecting and reacting against possible attacks to security enforcing operations and comprising a microcontroller with associated or embedded memory portions. An attack detector includes a ponder over for assigning a ponder value to an input command of the token or card, a counter connected to the output ponder over for storing a counter value, a threshold reference to define a comparison value and a comparator to compare the counter value with the threshold value and provide an output warning signal according to the result of the comparison.

BRIEF DESCRIPTION OF THE DRAWINGS

The features and advantages of the method and IC card according to the present invention will become apparent from the following description of an embodiment thereof, given by way of non-limiting example with reference to the accompanying drawings.

DETAILED DESCRIPTION OF THE PREFERRED EMBODIMENTS

Figure 1:
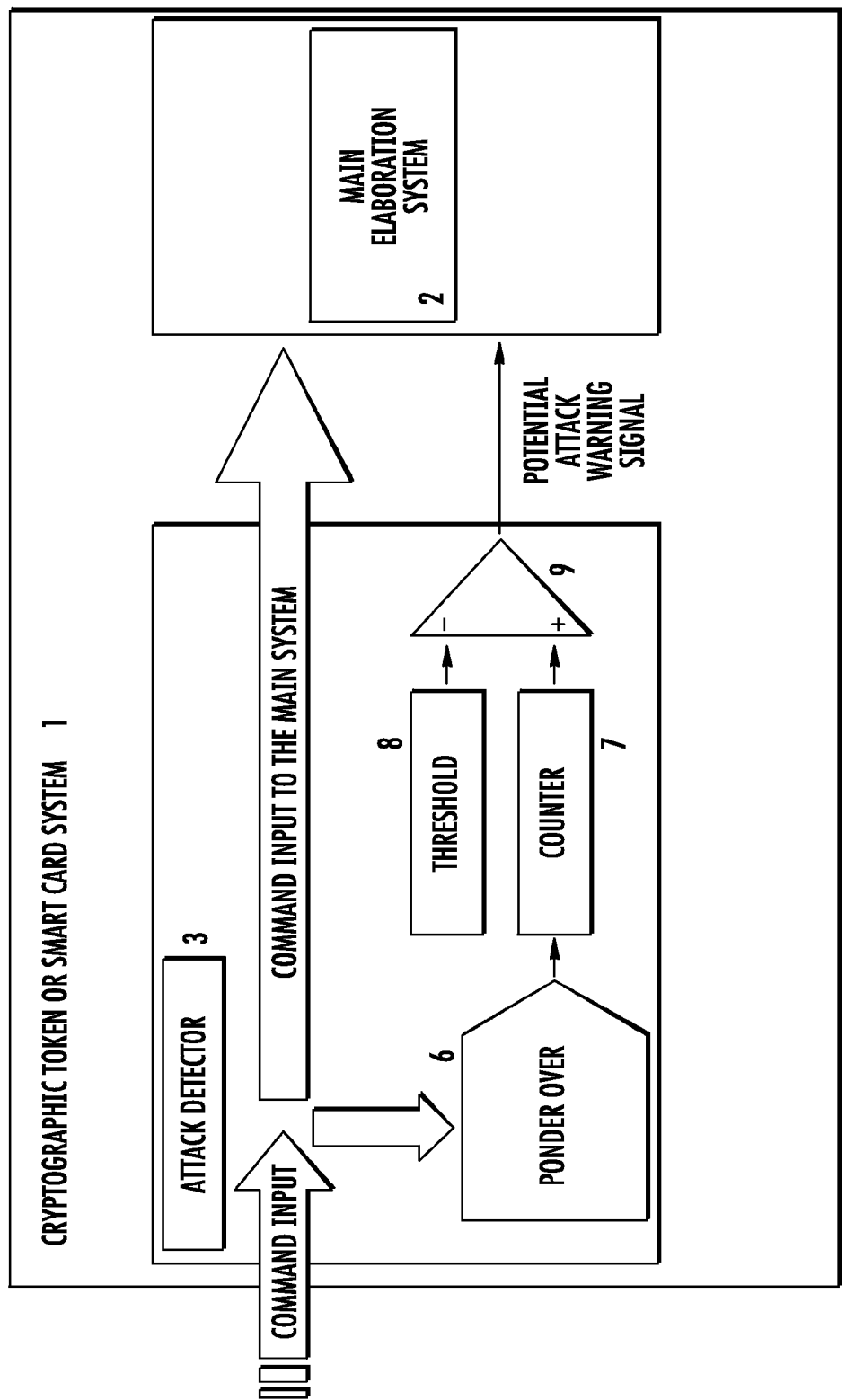
FIG. 1 is a schematic and simplified block diagram showing a cryptographic token or a smart card system equipped with an attack detector based on the method of the present invention.

With reference to the drawings a cryptographic token or IC card system according to the present invention is globally and schematically shown with the numeral reference 1. The IC card may be used for plug-in insertion into a host electronic device, not shown, but being of a conventional type such as a mobile telephone device, for example. The IC card 1 may have the format and the external shape of a common SIM card for mobile telephonic application. However, nothing prevents the card 1 from being structured according to a different shape or format required by a specific application.

The IC card 1 includes a microcontroller 2, that may be considered the main processing unit, and memory portions, as may be conventional, which are strictly associated to the microcontroller 2. For the purpose of the present invention the quality and composition of the memory portions associated to the microcontroller 2 is not particularly important. However, to provide a complete description of the system it may be considered that the token or card 1 is an integrated or embedded system equipped with a first read-only memory portion, a second or extended non-volatile memory portion and at least a further memory portion.

The first memory portion is generally a ROM memory including programs, i.e. software applications, masked on the read-only memory and defining the functionalities of the card. The second and extended memory portion is a non volatile memory and may be an electrically erasable memory portion of the EEPROM or Flash having a NOR structure and including subroutines, extended instructions and or customized data. The further memory portion may be structurally and functionally independent from both the first read only memory portion and the extended memory portion and may be a read/write memory such as a volatile RAM. As an alternative, the further memory portion may even be an EEPROM or another non-volatile memory device.

Advantageously, according to the present invention, the token or card 1 includes an attack detector 3 that may be structured as an hardware circuit portion or software stored in one of the above mentioned memory portions. More particularly, the attack detector 3 is involved in the cryptographic operations of the token 1 and includes an interface used to receive input commands and an output interface for providing output signals as a response.

The attack detector 3 includes the following components: a Ponder Over block 6 receiving the input commands and assigning a ponder value or weight to each input command; a Counter 7 connected to the output of ponder over 7 for incrementing or decrementing a stored counter value; a Threshold Reference 8 defining a threshold value for a comparison phase; and a Comparator 9 for comparing the value stored in the counter 7 with the threshold value and providing an output signal on the output interface based thereon, e.g. if the counter is less than the threshold.

More particularly the counter value doesn't relate to the execution of a specified input command but it is incremented or decremented every time that an input command is executed. In this way the reaching of the threshold reference 8 is determined by the sequence of execution of input commands; in other words the threshold reference is not strictly related to the number of times a specific input command is executed but it is determined by the contribution of all the input commands executed. The microcontroller 2, which normally processes the input data and provides a corresponding output, receives the output of the comparator 9. As an alternative the Operating System of the token or card 1 receives a warning signal from a running attack detecting subroutine.

To more fully understand the method of the present invention it worth while to note that the most common techniques of attack to cryptographic algorithms implemented on cryptographic tokens and smart cards are based on the repetitive execution of the card reading algorithm in order to acquire information useful to the attacker. Useful information could be, for example: cipher text, multiple plain/cipher text or physical attributes in dependence on the kind of attack. The number of executions required to complete successfully an attack varies considerably with the algorithm, its implementation and the instrumentation or reader available to the attacker, but it is typically considerably large, e.g. over 10,000 executions.

The time between subsequent algorithm executions is also a very important factor in determining the overall complexity of an attack; in fact an attack can be conducted successfully only if it require a time judged reasonable by the attacker. This is true both for the logical attacks such as known/chosen plain text attacks and adaptive chosen plain text attacks and for the power analysis and electromagnetic analysis attacks. Advantageously, the attack detector incorporated into the token or card 1 according to the present invention allows alerting the microcontroller 2 about a potential attack by issuing a warning signal when the execution of the security procedures based on cryptographic algorithm are invoked too often with respect to the typical working scenario.

The method of the present invention may include the following steps: detecting an input command for the cryptographic token; assigning a ponder value to such an input command; updating a counter value; comparing the counter value with a reference threshold; providing a warning signal output according to the result of the comparing phase. In other words, the counter value changes dynamically depending on the sequence of execution of the input commands, the counter value being updated according to the ponder values associated to the executed input commands.

The system can in this way set up appropriate reactions such as: slowing down the execution of the cryptographic algorithm to increase the time required for a successful attack, thus discouraging an attacker; blocking the cryptographic algorithm under execution; muting/disabling the card; and/or returning erroneous results to confuse the attacker or other measures.

According to the inventive method, the Ponder Over 6 assigns a ponder value to an input command; for instance, the ponder block 6 may be structured with a look up table including a ponder value for each different kind of input command. An example of the ponder over in the case of realization with a look up table may be as follows. For example, the card accepts three different Application Protocol Data Units (APDUs) in input: APDU#1, ADPU#2, APDU#3. Among these APDU, suppose that the APDU#2 is relevant for security because, for example, it triggers the execution of a cryptographic algorithm. Also suppose that the APDU#2 is more frequent than the other APDUs. The look up table could be organized as in Table 1 below. The ponder value is retrieved by looking up into the Ponder Over look up table with respect to the input APDU.

The ponder values assignment strategy could be summarized in this way, for example: ponder values have to be assigned considering the frequency of security relevant APDUs with respect to the frequency of the other APDUs in the case of normal working conditions; ponder values have to produce a warning in the case the attack detector detects that the frequency of the security relevant APDUs with respect to the other APDU exceeds the frequency in the case of normal working conditions; ponder values for security relevant APDUs should have a positive value; ponder values for non-security relevant APDUs should have a negative value. Moreover the ponder value should be inversely proportional to APDUs frequency, i.e. the more an APDU is issued frequently in the normal working condition the lower its ponder should be.

TABLE 1

Ponder Over Table

| APDU | Ponder Value | Note: |
|---|---|---|
| APDU #1 | −02 | Not Security Relevant very frequent APDU |
| APDU #2 | 10 | Security Relevant ADPU |
| APDU #3 | −04 | Not Security Relevant but not very frequent APDU |

Considering the ponder over implemented via the look up table of Table 1, suppose that the sequence of APDUs in the normal working condition is the following: APDU#3, APDU#1, APDU#1, APDU#1, APDU#2; and also suppose that the counter has an initial value of 20 and the threshold level is set to 25.

Table 2 and Table 3 sets forth the operation of the ponder over.

TABLE 2

Normal working sequence, no warning is issued by the attack detector

| Input APDU | Ponder Value | Counter Value (old + ponder = new value) | Threshold | Warning status |
|---|---|---|---|---|
| APDU #3 | −4 | 20 − 5 = 16 | 25 | No warn |
| APDU #1 | −2 | 16 − 2 = 14 | 25 | No warn |
| APDU #1 | −2 | 14 − 2 = 12 | 25 | No warn |
| APDU #1 | −2 | 12 − 2 = 10 | 25 | No warn |
| APDU #2 | +10 | 10 + 10 = 20 | 25 | No warn |
| APDU #3 | −4 | 20 − 4 = 16 | 25 | No warn |
| APDU #1 | −2 | 16 − 2 = 14 | 25 | No warn |
| APDU #1 | −2 | 14 − 2 = 12 | 25 | No warn |
| APDU #1 | −2 | 12 − 2 = 10 | 25 | No warn |
| APDU #2 | +10 | 10 + 10 = 20 | 25 | No warn |

TABLE 3

Abnormal working sequence; the attack detector issues a warning

| Input APDU | Ponder Value | Counter Value (old + ponder = new value) | Threshold | Warning status |
|---|---|---|---|---|
| APDU #3 | −4 | 20 − 4 = 16 | 25 | No warn |
| APDU #1 | −2 | 16 − 2 = 14 | 25 | No warn |
| APDU #2 | +10 | 14 + 10 = 24 | 25 | No warn |
| APDU #3 | −4 | 24 − 4 = 20 | 25 | No warn |
| APDU #1 | −2 | 20 − 2 = 18 | 25 | No warn |
| APDU #2 | +10 | 18 + 10 = 28 | 25 | Warning attack detected |

Figure 2:
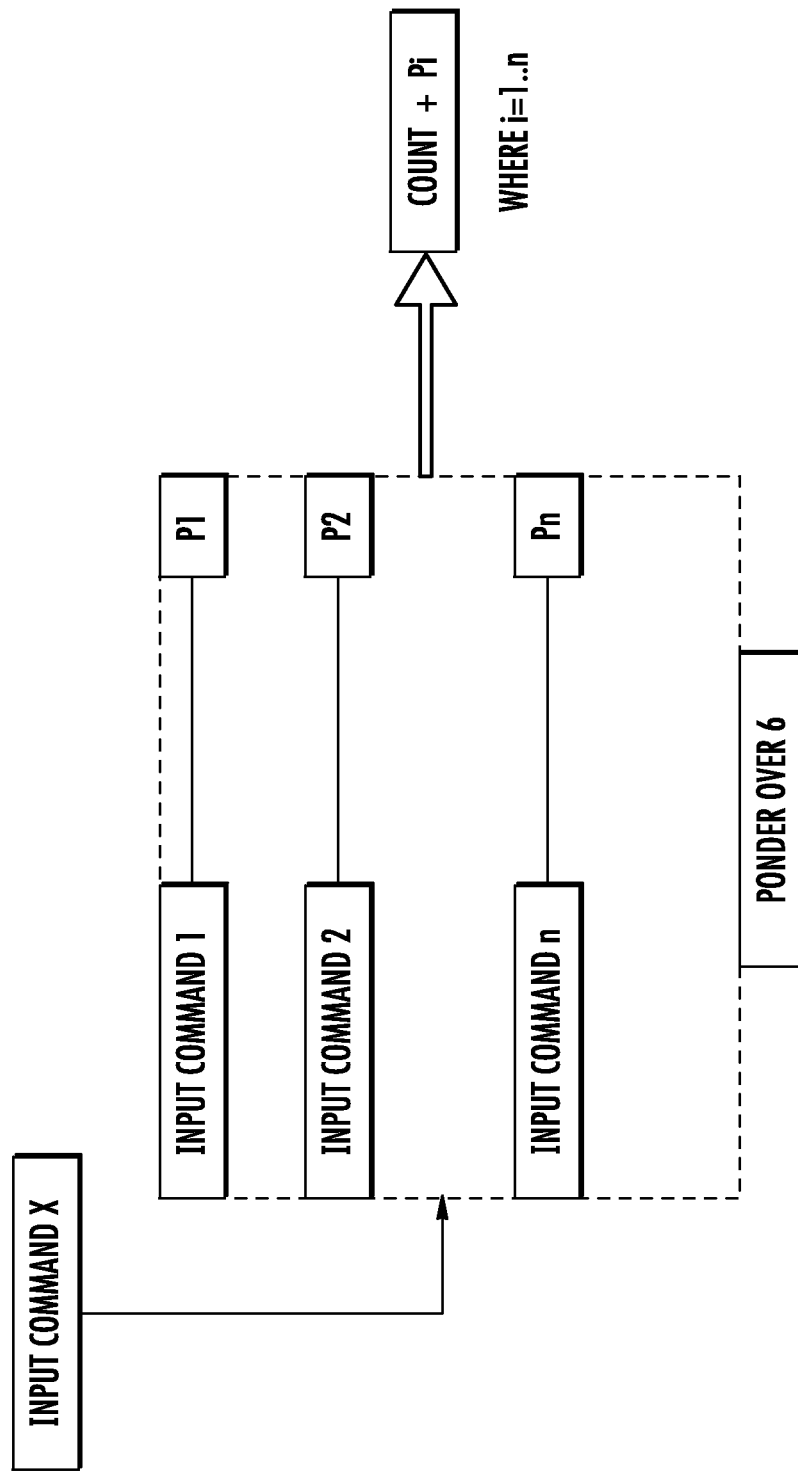
FIG. 2 is a more detailed and schematic block diagram of a portion of the system of FIG. 1.

FIG. 2 shows in a detailed and schematic view the counter value updating according to the method of the present invention. More particularly a generic "input command X", before being executed, is processed by the ponder over 6 that detects the ponder value associated with the input command X through a look up table like the one shown in table 5. If the ponder over 6 detects, for example, that the command to be executed is the input command "i", it increments the counter value adding, to its actual value, the ponder value "Pi", where i represents all the possible input commands. As an alternative, in case of software implementation, the pondering phase may be obtained by a cascade of test instructions of the "IF" kind in a specific subroutine, thus assigning a predetermined ponder value according to the result of an IF test.

It's important to note that the ponder values may even be varied after the processing of an input command. In other words, the ponder values in the look up table or the predetermined ponder values in the subroutine might be changed dynamically to increase the reaction force of the token or card 1 against a reiterated attack. The Counter 9 is provided to increment or decrement the stored counter value. Moreover, the counter 9 may be incremented by a predetermined or variable amount of integer values just according to the assigned ponder values.

The Threshold Reference 8 defines a threshold value for the comparison; this threshold value may even be updated after receipt of a first warning signal, so that a further or second attack attempt may be detected more quickly. Finally, the Comparator 9 compares the counter value with the threshold level and enables or generates an output, for instance if the counter is greater than the threshold.

A possible simplified version of the inventive structure or procedure would require a simple counter keeping and storing a predetermined value that should be decremented according to the output of the ponder block 6 or subroutine. When such a counter should reach a "0" value, the warning signal would be automatically generated.

The skilled artisan should appreciate that this possible simplified embodiment is just an alternative manner to realize the previously disclosed embodiment, since the final "0" value of the simplified and decremental counter may be considered corresponding to the reference threshold value and a comparison is considered performed just when the counter has reached the "0" value or an end or reset value. In this respect, at the very beginning the counter is initialized with a suitable starting value obtained for example by experimental results on the typical working scenario.

The counter 9 can store the counter value in a non volatile memory portion of the card so as to keep it even if a power loss occurs and avoiding an easy workaround based on power loss.

The attack detector may parse the input commands (APDUs in the case of Smart Card) received by the cryptographic token before they are elaborated or processed by the microcontroller. In particular the Ponder Over block 6 analyzes the input command and assigns it a ponder value to be used to update the counter value. This value can be positive or negative (for instance in the disclosed alternative embodiment) according to the ponder strategy designed in the ponder over block 6 and so can increment or decrement the value of the counter. In particular, negative values are assigned to all the security enforcing operations which invoke a cryptographic algorithm. As already mentioned, the ponder over can be based on a combinatory logic and implemented, for example, via look up tables or can be based on a more complex sequential logic network or algorithm.

In the case of a SIM card where the attack detector can be use to counteract the SIM cloning and increasing the protection of the network authentication algorithm against attacks, a negative value, opportunely selected on the base of experimental results can be assigned to the APDU RUN_GSM_Algorithm used to authenticate the card. Suitable positive values have to be assigned to all the other input APDUs. The counter value is constantly compared with a threshold value set up by the microcontroller. The threshold level is defined based upon practical issues and may be less than the counter starting value.

As an example, when the counter value goes below the threshold value the system attack detector generates a potential attack warning to the system to become aware of a potential attack and set up a reaction. The reaction could be to delay the next cryptographic calculation operation to increase the time to successfully conduct an attack, for example, recalling a delay subroutine.

Figure 3:
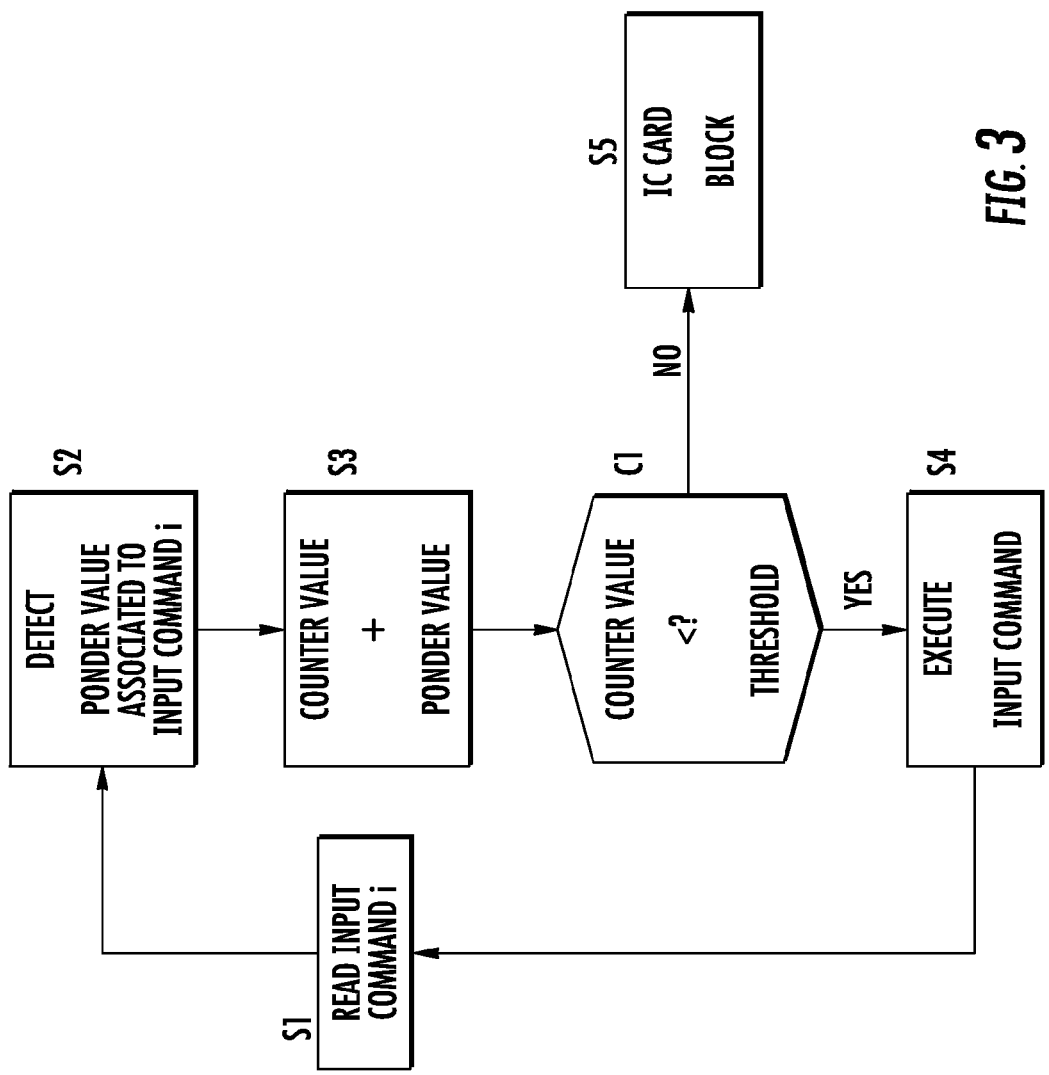
FIG. 3 is a flow chart showing the steps of the method according to the present invention.

FIG. 3 shows a flow chart representing various steps of a method according to the present invention; in particular with reference S1 is indicated the reading of the input command i and with S2 the assigning of the corresponding ponder value. The counter value is updated in S3 adding the ponder value of the input command i to its actual value; the new counter value is compared in C1 with the Threshold reference causing the disabling of the IC Card if the Threshold is reached, as indicated in S5. Otherwise, if the Threshold is not reached, the input command can be executed in S4.

An alternative response could be that of confusing the attacker with a wrong output value obtained for instance through a random number generator. Another possible alternative could be that of disabling the token or even a more complex reaction strategy.

Compared to the prior art, the present invention has an advantage of protecting both the implementation and the logic of the algorithm. Moreover the method is independent from the implementation and can be applied to all the algorithm and security procedures.

The invention offer an easy approach to SIM cloning problems of telecom operators who use old and breakable cryptographic algorithms and do not want to invest many resources in updating the network authentication systems with more resistant authentication cryptographic algorithms. Advantageously, the present invention is based on a method for detecting and reacting against possible attacks considering a ponder value associated to each input command and a counter value associated to the sequence of execution of the input command. In this way a possible reaction is raised according to the sequence of execution of the input commands, taking into consideration a ponder value with a high value for input commands needing a high degree of security and a low ponder value, eventually a negative value, for input commands considered not dangerous for the IC Card security.

This method is dynamic because a reaction is raised not depending on the number of times an input command is executed but depending on the entire set execution of input commands performed during the activation of the IC Card. In this way, the method prevents an undesired reaction due, for example, to acceptable user errors and, at the same time, provides for a correct reaction when the performed set of input commands is suspicious.

The invention does not limit the total number of invocations of the security procedure preventing the crash of the security system even in abnormal abuse of such procedure; it is not based on timing measures and then is applicable to all simple systems that do not have an internal, coherent and continuous working reference of time such as a smart card. Finally, the approach of the present invention can be partially implemented at the hardware level.

That which is claimed is:

1. A method for protecting a cryptographic token against a security attack, the method comprising:
    assigning a respective ponder value to each of a plurality of different types of input commands, the respective ponder values being variably weighted according to relevant security of the different input commands;
    detecting input commands input to the cryptographic token;
    updating a counter value based upon the respective ponder values assigned to the detected different types of input commands, the counter value thereby being increased and decreased depending on a sequence of the detected different types of input commands;
    comparing the counter value with a reference threshold; and
    providing a warning signal output indicating a security attack based upon the comparison.

2. A method according to claim 1, wherein the cryptographic token includes a microcontroller, and the warning signal output is provided to the microcontroller.

3. A method according to claim 1, wherein the counter value is initialized with a predetermined starting value based upon operation of the cryptographic token.

4. A method according to claim 1, wherein the cryptographic token includes a microcontroller; and wherein the input commands input to the cryptographic token are detected before they are processed by the microcontroller.

5. A method according to claim 1, wherein the counter value is constantly compared with the threshold value.

6. A method according to claim 1, wherein the counter value is one of a positive and a negative value.

7. A method according to claim 1, wherein the reference threshold is one of an end counter value and a reset counter value.

8. A cryptographic token comprising:
a security attack detector comprising
a ponder over block configured to assign respective ponder values to each of a plurality of different types of input commands for the token, the respective ponder values being variably weighted according to relevant security of the different input commands,
a counter coupled to an output of said ponder over block configured to store a counter value, the counter value being updated based upon the respective ponder values assigned to the detected different types of input commands, the counter value thereby being increased and decreased depending on a sequence of the detected different types of input commands,
a threshold reference block defining a comparison value, and
a comparator configured to compare the counter value with the threshold value and provide an output warning signal indicating a security attack.

9. A cryptographic token according to claim 8, wherein the output warning signal delays subsequent cryptographic token operations.

10. A cryptographic token according to claim 8, wherein said counter comprises an associated non-volatile memory to store the counter value.

11. A cryptographic token according to claim 8, wherein the counter value is initialized with a predetermined starting value based upon operation of the cryptographic token.

12. A cryptographic token according to claim 8, wherein said ponder over block comprises a look up table.

13. A cryptographic token according to claim 12, wherein the ponder values of the look up table are updated after the processing of an input command.

14. A cryptographic token including a microcontroller, the token comprising:
a security attack detector comprising
a ponder over block configured to assign respective ponder values to each of a plurality of different types of input commands for the token, the respective ponder values being variably weighted according to relevant security of the different input commands,
a counter coupled to an output of said ponder over block configured to store a counter value, the counter value being updated based upon the respective ponder values assigned to the detected different types of input commands, the counter value thereby being increased and decreased depending on a sequence of the detected different types of input commands,
a threshold reference block defining a comparison value, and
a comparator configured to compare the counter value with the threshold value and provide an output warning signal to the microcontroller based thereon and indicating a security attack.

15. A cryptographic token according to claim 14, wherein the output warning signal is applied to the microcontroller to delay subsequent cryptographic token operations.

16. A cryptographic token according to claim 14, wherein said counter comprises an associated non-volatile memory portion of said microcontroller to store the counter value.

* * * * *